US008851450B2

(12) United States Patent
Mizobe et al.

(10) Patent No.: US 8,851,450 B2
(45) Date of Patent: Oct. 7, 2014

(54) METALLIC COMPOSITE COMPONENT, IN PARTICULAR FOR AN ELECTROMAGNETIC VALVE

(75) Inventors: Takuya Mizobe, Yamato (JP); Stefan Oetinger, Stegaurach (DE)

(73) Assignee: Robert Bosch GmbH, Stuttgart (DE)

( * ) Notice: Subject to any disclaimer, the term of this patent is extended or adjusted under 35 U.S.C. 154(b) by 934 days.

(21) Appl. No.: 12/737,488

(22) PCT Filed: Jul. 17, 2009

(86) PCT No.: PCT/EP2009/059206
§ 371 (c)(1), (2), (4) Date: Apr. 13, 2011

(87) PCT Pub. No.: WO2010/007153
PCT Pub. Date: Jan. 21, 2010

(65) Prior Publication Data
US 2011/0186769 A1 Aug. 4, 2011

(30) Foreign Application Priority Data
Jul. 18, 2008 (DE) ........................ 10 2008 040 545

(51) Int. Cl.
*F16K 51/00* (2006.01)
*H01F 7/08* (2006.01)
*H01F 7/16* (2006.01)
*H01F 1/16* (2006.01)

(52) U.S. Cl.
CPC .............. *H01F 7/081* (2013.01); *H01F 7/1607* (2013.01); *H01F 2007/085* (2013.01); *H01F 1/16* (2013.01)
USPC ...................................... 251/129.15; 251/368

(58) Field of Classification Search
USPC .............................. 251/129.15, 368; 148/120
See application file for complete search history.

(56) References Cited

U.S. PATENT DOCUMENTS

| | | | | |
|---|---|---|---|---|
| 4,539,542 | A * | 9/1985 | Clark | 335/261 |
| 4,896,409 | A | 1/1990 | Rösch et al. | |
| 5,079,534 | A * | 1/1992 | Steingroever et al. | 335/284 |
| 6,254,695 | B1 * | 7/2001 | Herzer et al. | 148/120 |
| 8,245,402 | B2 * | 8/2012 | Seitter et al. | 29/890.131 |
| 2005/0211938 | A1 * | 9/2005 | Ryuen et al. | 251/129.15 |
| 2010/0126007 | A1 | 5/2010 | Seitter et al. | |

FOREIGN PATENT DOCUMENTS

| | | |
|---|---|---|
| DE | 35 02 287 | 7/1986 |
| DE | 42 37 405 | 6/1993 |
| DE | 102005039288 A1 * | 2/2007 |
| DE | 10 2006 055 010 | 5/2008 |
| EP | 0 629 711 | 12/1994 |
| EP | 1 450 380 | 8/2004 |
| EP | 1 690 957 | 8/2006 |
| GB | 2 262 659 | 6/1993 |
| JP | 53-18701 | 6/1973 |

(Continued)

*Primary Examiner* — John Bastianelli
(74) *Attorney, Agent, or Firm* — Kenyon & Kenyon LLP

(57) ABSTRACT

A composite component includes at least two sections having different magnetization, the at least two sections in the integrally formed component lying directly next to each other. The base material of the composite component is a semi-austenitic steel. A first section has a higher saturation polarization $J_S$ than an adjacent second section, the second section having a minimum saturation polarization $J_S$ of 0.1 T to 1.3 T and/or a maximum relative permeability $\mu_r$ of 2 to 150. The composite component is suitable for use in electromagnetic valves, e.g., in fuel injectors of internal combustion engines.

8 Claims, 2 Drawing Sheets

(56) References Cited

FOREIGN PATENT DOCUMENTS

| | | |
|---|---|---|
| JP | 54-161061 | 12/1979 |
| JP | 63-40304 | 2/1988 |
| JP | 6-74124 | 3/1994 |
| JP | 06 074124 | 3/1994 |
| JP | 6-346148 | 12/1994 |
| JP | 7-11397 | 1/1995 |
| WO | WO 2008/061829 | 5/2008 |

* cited by examiner

METALLIC COMPOSITE COMPONENT, IN PARTICULAR FOR AN ELECTROMAGNETIC VALVE

BACKGROUND OF THE INVENTION

1. Field of the Invention

The present invention a metallic composite component, in particular for an electromagnetic valve.

2. Description of the Related Art

FIG. 1 shows a previously known fuel injector from the related art, which features a classic three-part structure of an inner metallic flow guidance part and housing component at the same time. This inner valve pipe is made up of an intake nipple forming an inner pole, a nonmagnetic intermediate part and a valve-seat support accommodating a valve seat, and is described in greater detail in the description of FIG. 1.

From published German patent application document DE 35 02 287 A1, a method is already known for producing a hollow cylindrical metallic housing having two magnetizable housing parts and an amagnetic housing zone lying between them and separating the housing parts magnetically. This metallic housing is pre-worked from a magnetizable blank in one piece, right down to an oversize in the outer diameter, an annular groove being cut into the inner wall of the housing to a width of the desired middle housing zone. With the housing rotating, a nonmagnetizable filler material is filled into the annular groove while heating the annular groove region, and the rotation of the housing is kept going until the filler material solidifies. The housing is subsequently machined on the outside to the final dimensions of the outer diameter, so that there is no longer any connection between the magnetizable housing parts. A valve housing produced in this manner may be used in solenoid valves for antilock braking systems (ABS) of motor vehicles, for instance.

From published German patent document DE 42 37 405 C2, methods for producing a static core for injection valves for internal combustion engines (see FIG. 5 of this document) are already known. The methods are distinguished in that they provide a one-piece, sleeve-shaped, magnetic martensitic workpiece, either directly or via prior conversion processes, which workpiece is subjected to a local heat treatment in a middle section of the magnetic, martensitic workpiece in order to convert this middle section into a nonmagnetic, austenitic middle section. Alternatively, elements forming molten austenite or molten ferrite are added to the location of the heat treatment during the local heat treatment, using a laser, to form a nonmagnetic, austenitic middle section of the static core.

BRIEF SUMMARY OF THE INVENTION

The metallic composite component according to the present invention has the advantage that a magnetic separation is realized in an especially simple and cost-effective manner in a one-piece, e.g., sleeve-shaped composite component, which component is able to be produced in a reliable manner using mass-production technology. The composite component is characterized by the fact that at least two adjacent sections having different magnetization are obtained, the magnetic throttle in the composite component, which is formed by the second section having a saturation polarization (also referred to as magnetic saturation) $J_S$ that is less than that of the first sections, advantageously not being nonmagnetic, but partially magnetic at an order of magnitude that is ideal for the use of such a composite component in an electromagnetic valve.

It is also advantageous that great flexibility is offered in the development of the geometry of the composite component itself, such as length, outside diameter and gradations, for example.

It is especially advantageous if a semi-austenitic, stainless steel such as 17-7PH or 15-8PH is used as base material for the composite component. The material is made magnetic by a single or by repeated heat treatment(s) and intense cooling during or following the plastic shaping. A local heat treatment using a laser beam, induction heating or electron radiation or a similar procedure is then performed in one section, through which the second section having reduced saturation polarization is obtained following the cooling.

DETAILED DESCRIPTION OF THE INVENTION

Figure 1:
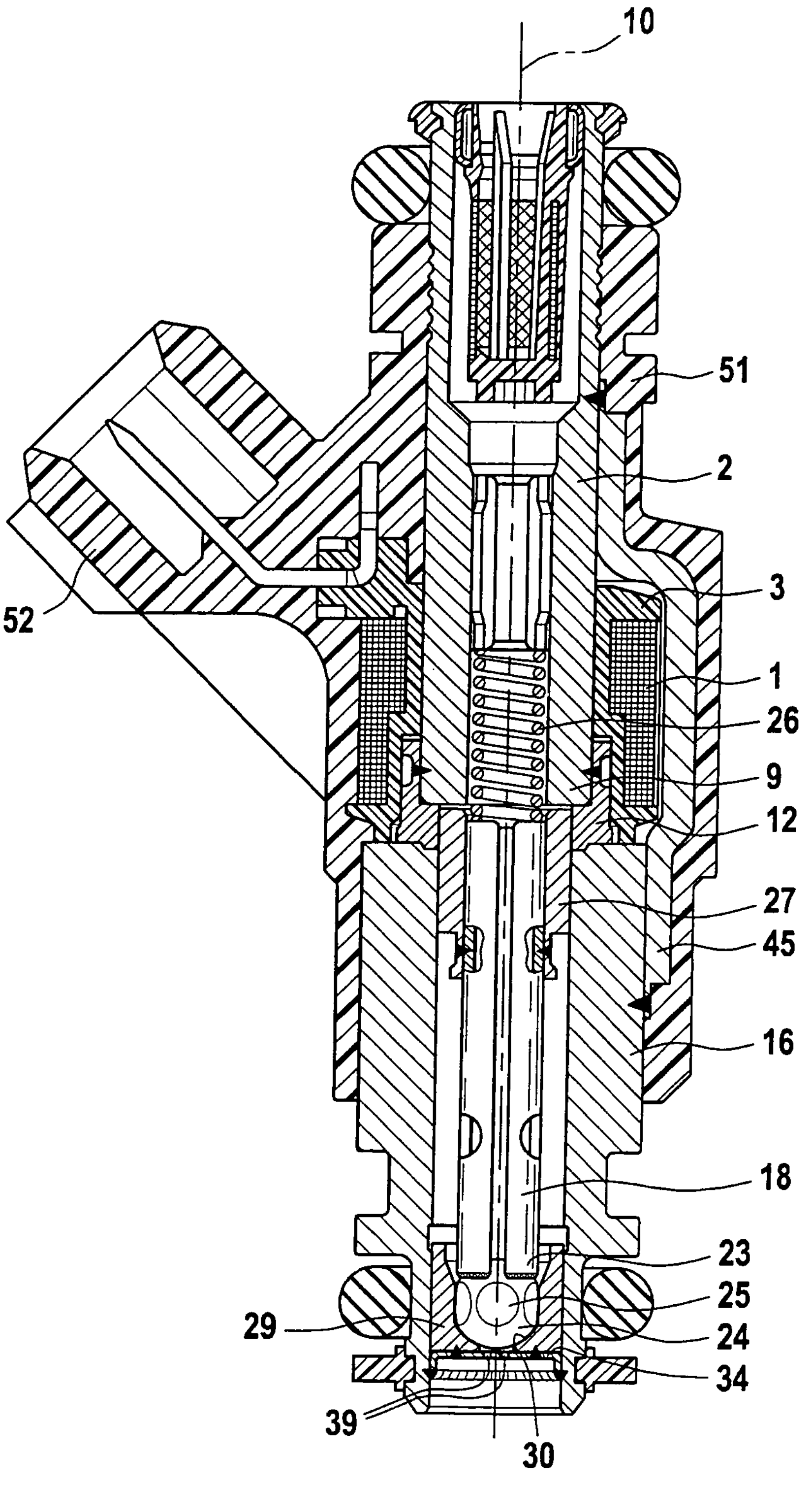
FIG. 1 shows a fuel injector according to the related art, having a three-part inner metallic valve pipe as housing.
Figure 3:
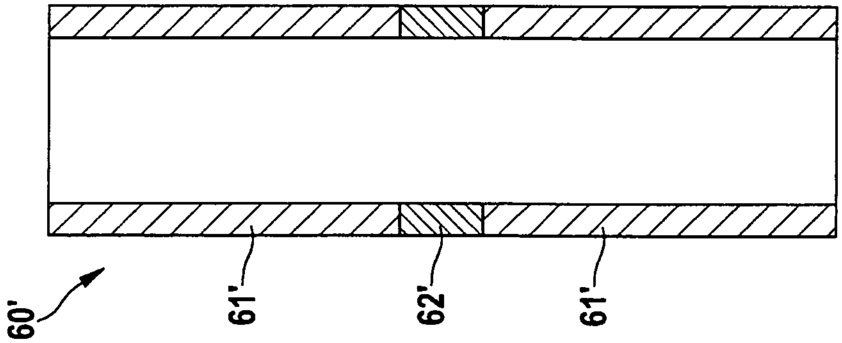
FIG. 3 shows a second composite component according to the present invention, made up of three sections.
Figure 2:
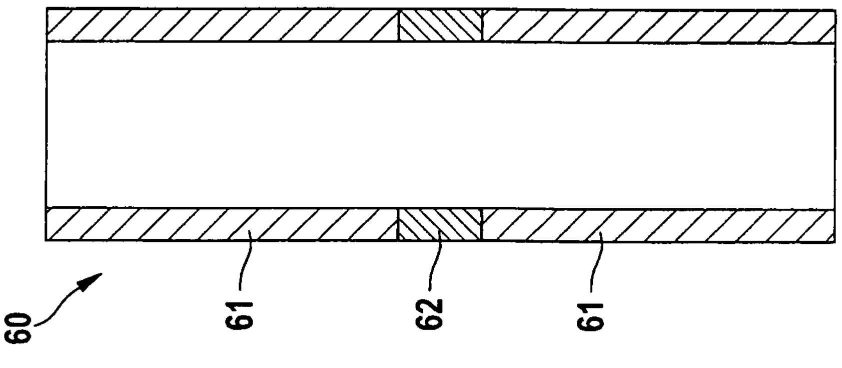
FIG. 2 shows a first composite component according to the present invention, made up of three sections.

Before the characteristic of metallic composite component 60, 60' according to the present invention is described based on FIGS. 2 and 3, a fuel injector according to the present art shall be elucidated in greater detail, on the basis of FIG. 1, as one possible application product for such a composite component 60, 60'.

The electromagnetically operable valve in the form of a fuel injector, shown in exemplary fashion in FIG. 1, for fuel-injection systems of mixture-compressing, externally ignited internal combustion engines has a tubular core 2, which is surrounded by a solenoid coil 1 and serves as fuel intake neck as well as inner pole, core 2 having, for example, a constant outer diameter over its entire length. A coil shell 3 graded in the radial direction accommodates a winding of solenoid coil 1 and, in conjunction with core 2, enables the fuel injector to have a compact design in the region of solenoid coil 1.

A tubular, metal, nonmagnetic intermediate part 12 is sealingly connected to a lower core end 9 of core 2 by welding, concentrically to a longitudinal valve axis 10, and partially surrounds core end 9 in an axial manner. A tubular valve-seat support 16, which is rigidly connected to intermediate part 12, extends downstream from coil shell 3 and intermediate part 12. An axially movable valve needle 18 is situated in valve seat support 16. A ball-shaped valve closure member 24 at whose circumference, for example, five flattened regions 25 are provided for the fuel to flow past, is provided at downstream end 23 of valve needle 18.

The fuel injector is actuated electromagnetically, in the known manner. For the axial displacement of valve needle 18, and thus for the opening counter to the spring force of a restoring spring 26, or for the closing of the fuel injector, the electromagnetic circuit having solenoid coil 1, core 2 and an armature 27 is utilized. Pipe-shaped armature 27 is rigidly connected to an end of valve needle 18 facing away from valve-closure member 24, by a welded seam, for example, and is aligned with core 2. By welding, a cylindrical valve-seat member 29 having a fixed valve seat 30 is mounted in the downstream end of valve-seat support 16 facing away from core 2 so as to form a seal.

Spherical valve-closure member 24 of valve needle 18 interacts with valve seat 30 of valve-seat member 29, which frustoconically tapers in the direction of flow. At its lower end face, valve seat member 29 is rigidly and sealingly connected to a pot-shaped spray orifice disk 34, for example, by a welded seam which is developed with the aid of a laser, for instance. In spray orifice disk 34, at least one, but, for example, four, spray-discharge orifices 39 are provided which are formed by eroding or stamping, for example.

In order to conduct the magnetic flux for the optimal activation of armature 27 when solenoid coil 1 is supplied with current, and with that, for the secure and accurate opening and closing of the valve, solenoid coil 1 is surrounded by at least one conductive element 45, developed, for instance, as a bracket and used as a ferromagnetic element, which surrounds solenoid coil 1 at least partially in the circumferential direction, and which lies with its one end against core 2 and with its other end against valve seat support 16, and is able to be connected to the latter, for instance, by welding, soldering or bonding. Core 2, nonmagnetic intermediate part 12 and valve seat support 16 form an inner metallic valve pipe as skeleton and, with that, also the housing of the fuel injector; they are firmly connected to one another and altogether extend over the entire length of the fuel injector. All additional functional groups of the valve are disposed within or around the valve pipe. This setup of the valve pipe involves the classical three-part design of a housing for an electromagnetically operable aggregate, such as a valve, having two ferromagnetic or magnetizable housing regions which are magnetically separated from each other by a nonmetallic intermediate part 12, or which are at least connected to each other via a magnetic throttling point, for the effective conduction of the magnetic circuit lines in the region of armature 27.

The fuel injector is largely surrounded by a plastic extrusion coat 51, which extends in the axial direction from core 2, over magnetic coil 1 and the at least one conductive element 45, to valve-seat support 16, the at least one conductive element 45 being completely covered in the axial and circumferential directions. A likewise extruded electrical connection plug 52, for instance, is also part of this plastic extrusion coat 51.

FIG. 2 shows a composite component 60 according to the present invention, which is made up of three sections 61, 62, 61. Essential in this composite component 60 is, however, that at least one section 61 is provided that is well magnetizable, which is directly adjoined in integral fashion by a second section 62 which features partially reduced saturation polarization $J_S$. The at least one section 62 having reduced saturation polarization $J_S$ has a minimum saturation polarization $J_S$ of 0.1 T to 1.3 T, and/or a maximum relative permeability $\mu_r$ of 2 to 150.

A semi-austenitic, stainless steel (e.g., 17-7PH, 15-8PH) is used as base material for composite component 60. The material is made magnetic by a single or by repeated heat treatment(s), possibly using intensive cooling, or by the plastic shaping into sleeve form, possibly including intensive cooling. In one section, a local heat treatment using a laser beam, induction heating or electron radiation or a similar procedure is then carried out, through which partially-magnetic section 62 is then obtained following the cooling.

The material in magnetic section 61 or in both magnetic sections 61 is characterized by the fact that it features a saturation polarization $J_S$ of 0.8 T to 1.5 T at a residual austenite content of 0 to 50%. In contrast, the material in section 62 having partially reduced saturation polarization $J_S$ assumes a saturation $J_S$ of at least 0.1 T at a ferrite or martensite content of >0.

In a second variant of an embodiment according to the present invention (FIG. 3), composite component 60' is present in slightly modified form. Essential with regard to this composite component 60' is that at least one section 61' having partially reduced saturation polarization $J_S$ is provided, which is directly adjoined in one piece by a second section 62' having still further reduced saturation polarization $J_S$ The at least one section 61' having reduced saturation polarization $J_S$ has a saturation polarization $J_S$ of 0.1 T to 1.7 T, but a magnetic induction of B4000<=0.3 T (H=4,000 A/m). Second section 62' having still further reduced saturation polarization $J_S$ has a saturation polarization $J_S$ of 0.1 T to 1.3 T and/or a maximum relative permeability $\mu_r$ of 2 to 150.

Here, too, a semi-austenitic, stainless steel (e.g., 17-7PH, 15-8PH) is used as base component for composite component 60. The material is made magnetic by a single or by multiple heat treatment(s), possibly using intensive cooling, or by the plastic shaping into sleeve form, possibly using intensive cooling. In one section, a local heat treatment using a laser beam, induction heating or electron radiation or a similar procedure is then carried out, through which section 62' is obtained following the cooling.

The material in the two sections 61' having partially reduced saturation polarization $J_S$ is characterized by the fact that it has a saturation polarization $J_S$ of 0.8 T to 1.5 T at a residual austenite content of >0. In contrast, the material in section 62' having still further reduced saturation polarization $J_S$ has a saturation $J_S$ of at least 0.1 T at a ferrite or martensite content of >0.

The magnetic throttle in composite component 60, 60' formed by sections 62, 62' having a lower saturation polarization $J_S$ than sections 61, 61', is advantageously not nonmagnetic as such, but partially magnetic, at an order of magnitude that ideally allows such a composite component 60, 60' to be used in an electromagnetic valve.

Figure 4:
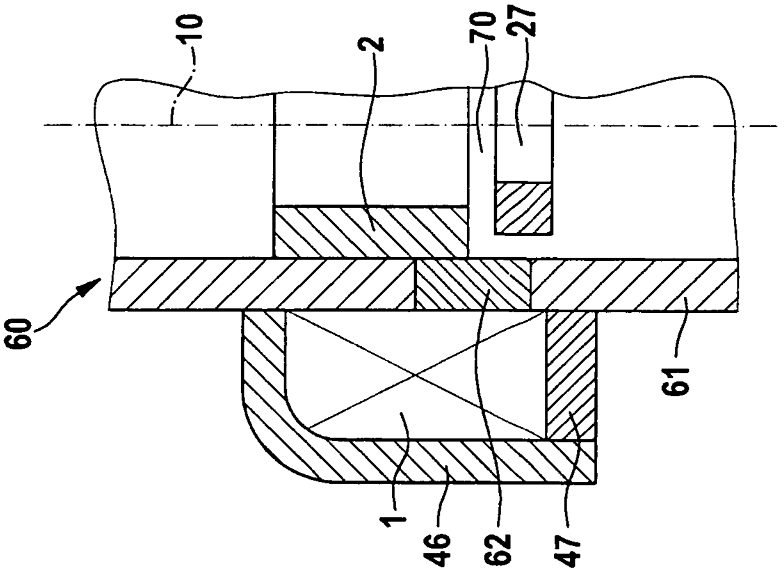
FIG. 4 shows a schematized cut-away from an injection valve having a composite component according to the present invention, for the purpose of clarifying the application possibility.

FIG. 4 shows a schematic cutout from a fuel injector having a composite component 60, 60' produced according to the present invention, which is installed in the valve as a thin-walled sleeve and thus surrounds core 2 and armature 27 radially and in the circumferential direction, while itself being surrounded by solenoid coil 1. It becomes clear that middle section 62 of composite component 60 lies in the axial extension region of a working air gap 70 between core 2 and armature 27, in order to optimally and effectively conduct the magnetic circuit lines within the magnetic circuit. Instead of bracket-shaped conducting element 45 shown in FIG. 1, the outer magnetic circuit component is executed as a magnetic cup 46, for instance, the magnetic circuit being closed between magnetic cup 46 and housing 66 via a cover element 47. Metallic composite component 60 is usable not only as valve sleeve in an electromagnetic valve, but also as core 2, for example.

The present invention is by no means restricted to the use in fuel injectors or solenoid valves for antilock braking systems, but relates to all electromagnetically operable valves in different fields of application, and generally to all static housings in assemblies in which zones of different magnetism are required successively. Composite component 60, 60' is able to be produced not only in three successive sections, but also in more than three sections.

What is claimed is:

1. A composite component, comprising:

a first magnetic section; and a second magnetic section;

wherein the first and second magnetic sections have different magnetization and are situated immediately next to each other, and wherein the base material of the composite component is a semi-austenitic steel, and the first section has a higher magnetic saturation level than the adjacent second section, the second magnetic section having at least one of: (i) a minimum magnetic saturation level of 0.1 T to 1.3 T; and (ii) a maximum relative permeability of 2 to 150.

2. The composite component as recited in claim 1, wherein the material in the second section includes one of a ferrite or martensite.

3. The composite component as recited in claim 1, wherein the material in the first section has a magnetic saturation level of 0.8 T to 1.5 T at a residual austenite content of 0 to 50%.

4. The composite component as recited in claim 1, wherein the first section has a magnetic saturation level of 0.1 T to 1.7 T, and a magnetic induction of B4000<=0.3 T.

5. The composite component as recited in claim 4, wherein the material in the first section has a magnetic saturation level of 0.8 T to 1.5 T at a residual austenite content of >0.

6. The composite component as recited in claim 2, wherein the second section forms a magnetic throttle in the composite component.

7. The composite component as recited in claim 2, wherein the composite component is implemented in hollow-cylindrical, sleeve-type form.

8. The composite component as recited in claim 2, wherein the composite component is incorporated in an electromagnetic valve as one of a valve sleeve or core.

* * * * *